US012022850B2

United States Patent
Kim et al.

(10) Patent No.: US 12,022,850 B2
(45) Date of Patent: Jul. 2, 2024

(54) METHOD FOR PREPARING VITAMIN D DERIVED FROM SHIITAKE MUSHROOMS

(71) Applicants: Jeong Ok Kim, Jinju-si (KR); HK BIOTECH CO., LTD., Jinju-si (KR)

(72) Inventors: Jeong Ok Kim, Jinju-si (KR); Yeong Lae Ha, Jinju-si (KR)

(73) Assignees: Jeong Ok Kim, Jinju-si (KR); HK BIOTECH CO., LTD., Jinju-si (KR)

( * ) Notice: Subject to any disclaimer, the term of this patent is extended or adjusted under 35 U.S.C. 154(b) by 0 days.

(21) Appl. No.: 17/797,721

(22) PCT Filed: Dec. 21, 2020

(86) PCT No.: PCT/KR2020/018776
§ 371 (c)(1),
(2) Date: Aug. 5, 2022

(87) PCT Pub. No.: WO2021/157856
PCT Pub. Date: Aug. 12, 2021

(65) Prior Publication Data
US 2023/0200413 A1    Jun. 29, 2023

(30) Foreign Application Priority Data
Feb. 6, 2020    (KR) .................. 10-2020-0014531

(51) Int. Cl.
*A23L 3/28* (2006.01)
*A23L 31/00* (2016.01)

(52) U.S. Cl.
CPC ............... *A23L 3/28* (2013.01); *A23L 31/00* (2016.08)

(58) Field of Classification Search
None
See application file for complete search history.

(56) References Cited

U.S. PATENT DOCUMENTS

2018/0374536 A1*  12/2018  Chalupa ............... H10B 63/80

FOREIGN PATENT DOCUMENTS

| CN | 109527530 A | 3/2019 |
| JP | 2004-222627 A | 8/2004 |
| JP | 2006-230327 A | 9/2006 |

(Continued)

OTHER PUBLICATIONS

Ares et el. ("Sensory shelf life of shiitake mushrooms stored under passive modified atmosphere", Postharvest Biology and Technology, vol. 41, Issue 2, 2006, pp. 191-197, ISSN 0925-5214, https://doi.org/10.1016/j.postharvbio.2006.03.013). (Year: 2006).*

(Continued)

*Primary Examiner* — Stephanie A Cox
(74) *Attorney, Agent, or Firm* — Revolution IP, PLLC

(57) ABSTRACT

A method for preparing shiitake mushrooms with an increased vitamin D2 content includes: (1) a first step of pre-aging shiitake mushrooms at room temperature or less; (2) a second step of aging the pre-aged shiitake mushrooms at room temperature; (3) a third step of chopping the aged shiitake mushrooms; (4) a fourth step of irradiating the chopped shiitake mushrooms with UV-B; (5) a fifth step of thermally treating the shiitake mushroom pieces irradiated with UV-B; and (6) a sixth step of crushing the thermally treated shiitake mushroom pieces.

3 Claims, 2 Drawing Sheets

(56) References Cited

FOREIGN PATENT DOCUMENTS

| | | |
|---|---|---|
| JP | 2013-244010 A | 12/2013 |
| KR | 10-2003-0040258 A | 5/2003 |
| KR | 10-0637833 B1 | 10/2006 |
| KR | 10-1171465 B1 | 8/2012 |
| KR | 10-1461635 B1 | 11/2014 |
| KR | 10-1588105 B1 | 2/2016 |
| KR | 10-2016-0080731 A | 7/2016 |
| KR | 10-2017-0079869 A | 7/2017 |

OTHER PUBLICATIONS

International Search Report for PCT/KR2020/018776 mailed Mar. 26, 2021 from Korean Intellectual Property Office.

* cited by examiner

【Figure 1】
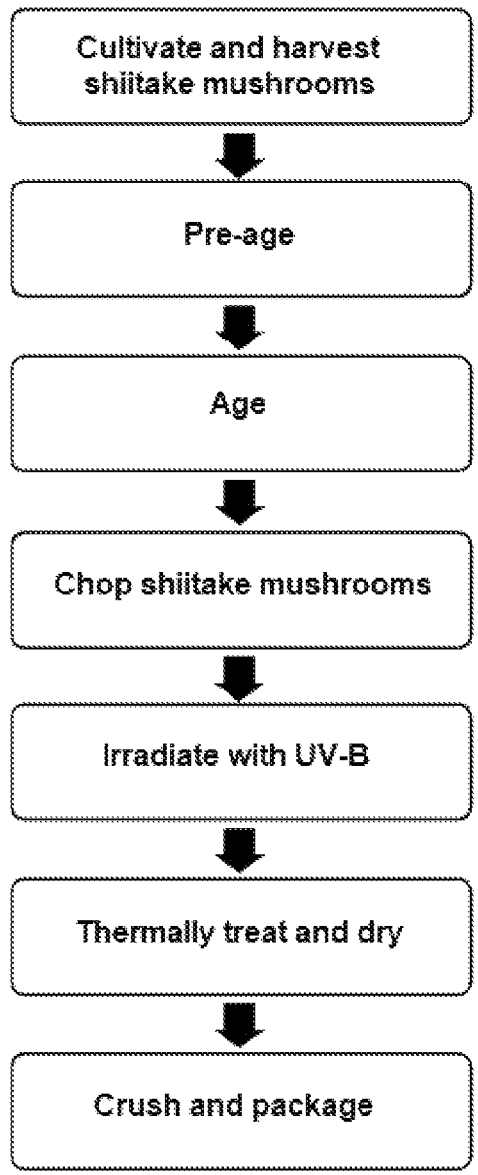

【Figure 2】
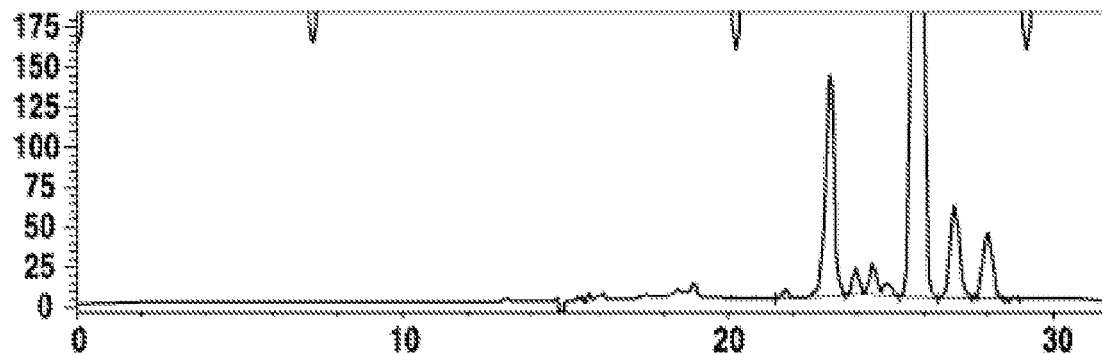
【Figure 3】
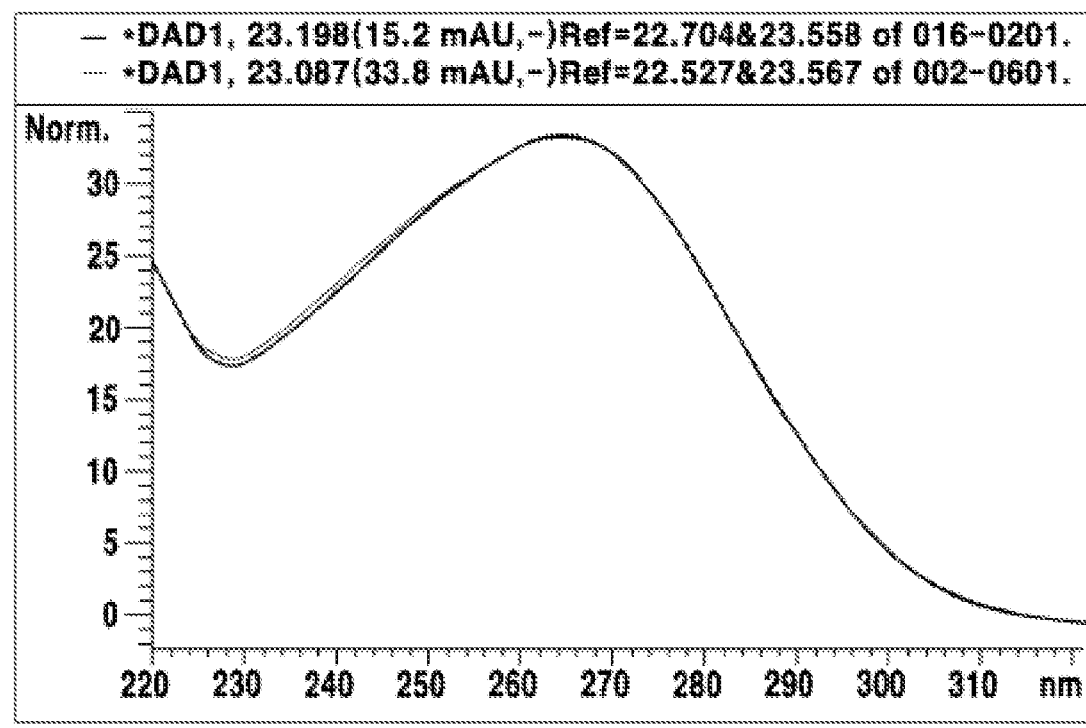

METHOD FOR PREPARING VITAMIN D DERIVED FROM SHIITAKE MUSHROOMS

TECHNICAL FIELD

The present invention relates to a method for preparing shiitake mushrooms with an increased vitamin D content, and more particularly characterized by chopping shiitake mushrooms and subjected to pre-aging, aging, irradiating with UV-B, and thermally treating steps, irradiating the chopped shiitake mushrooms with UV-B, and thermally treating the shiitake mushrooms irradiated with UV-B.

BACKGROUND ART

Vitamin D is a nutrient that plays an important role of promoting absorption of calcium and phosphoric acid in the small intestine, maintaining calcium functions, preventing osteoporosis, serving as a hormone, and helping in preventing and treating various diseases such as Alzheimer's and the like. The types of vitamin D discovered so far are from D2 to D7, and among these types, D2 and D3 have biologically high activity.

The recommended daily allowance intake of this vitamin D is 10 μg (400 IU) for children aged 15 or under and women aged 50 or over, and 5 μg (200 IU) for adults aged 50 or under, but recently, vitamin D biosynthesis in the skin has been disturbed because the time of exposure to UV rays is limited due to increased indoor life, wearing of masks due to fine dust and the like, and the use of sunscreen. In particular, vitamin D deficiency may lead to rickets in growing children and osteomalacia in perimenopausal women and the elderly, and cause hypocalcemia, hypothyroidism, and bone loss.

Vitamin D, which may be taken through the diet, is contained in trace amounts in mushrooms, fish, meat, and milk. Particularly, mushrooms contain a lot of ergosterol, a precursor of vitamin D2; hence, when vitamin D2 synthesized from ergosterol is taken as a health functional food, the vitamin D2 is converted to 1, 25-hydroxyvitamin D2, an active form of vitamin D2 through both in the liver and kidneys, to performs various physiological functions as vitamin D2.

Most vitamin D3 distributed in the market is chemically synthesized from cholesterol obtained from wool. In other words, since vitamin D3 is synthesized through processes of extracting and purifying Lanolin of the wool with an organic solvent→separating and purifying cholesterol→chemically synthesizing 7-dehydrocholesterol→performing UV irradiation, it is highly likely that organic solvents, cholesterol, impurities and the like will remain in final vitamin D3 products. In addition, there is "yeast vitamin D3" distributed in the market, but the yeast vitamin D3 is not a vitamin actually derived from yeast, but is prepared by mixing synthetic vitamin D3 synthesized from lanolin of wool with yeast.

Vitamin D produced from button mushrooms has a problem in that since the structure of fruiting bodies is soft, and the moisture content is high, and thus the initial number of bacteria is 1000/g or more; and hence, it is not suitable for a standard when producing a final product. In addition, there are few types of foods that can supply vitamin D through the diet, and the vitamin D content in the foods is very low, so intake through food is very limited. Therefore, there is an urgent need to develop foods fortified with vitamin D.

Meanwhile, Patent Documents 1 to 3 disclose methods for synthesizing vitamin D2 from ergosterol contained in mushrooms by irradiating the mushrooms with UV-B (Korean Patent Registration Nos. 10-0637833, 10-1588105, and 10-1171465). However, in the case of Patent Documents 1 to 3, there is an advantage that vitamin D2 has been increased by irradiating the mushrooms with UV-B, but as a result, since the content of vitamin D2 is less than 240 μg/g in oyster mushrooms and 6.93 μg/g in shiitake mushrooms, which are very low, and there is a problem of low marketability and economic feasibility, such as an increase in manufacturing cost due to a long irradiation time.

Accordingly, the present inventors studied not only conditions for irradiating mushrooms with UV light in the related art but also pretreatment conditions that may affect the content of vitamin D, and established an optimal condition for preparing mushrooms with a significantly increased vitamin D content, by analyzing a difference in content of vitamin D, thereby completing the present invention.

PRIOR ART DOCUMENTS

Patent Documents (Patent Document 1) Korean Patent Registration No. 10-0637833
(Patent Document 2) Korean Patent Registration No. 10-1588105
(Patent Document 3) Korean Patent Registration No. 10-1171465

DISCLOSURE

Technical Problem

It is an object of the present invention to provide a method for preparing shiitake mushrooms with an increased vitamin D2 content and shiitake mushrooms with an increased vitamin D2 by the method.

More specifically, an object of the present invention is to provide shiitake mushrooms with an increased vitamin D2 content including: (1) a first step of pre-aging shiitake mushrooms at room temperature or less; (2) a second step of aging the pre-aged shiitake mushrooms at room temperature; (3) a third step of chopping the aged shiitake mushrooms; (4) a fourth step of irradiating the chopped shiitake mushrooms with UV-B; (5) a fifth step of thermally treating the shiitake mushroom pieces irradiated with UV-B; and (6) a sixth step of crushing the thermally treated shiitake mushroom pieces.

Technical Solution

In order to solve the above object, the present invention provides a method for preparing shiitake mushrooms with an increased vitamin D2 content. The present invention provides a method for preparing shiitake mushrooms with an increased vitamin D2 content including: (1) a first step of pre-aging shiitake mushrooms at room temperature or less; (2) a second step of aging the pre-aged shiitake mushrooms at room temperature; (3) a third step of chopping the aged shiitake mushrooms; (4) a fourth step of irradiating the chopped shiitake mushrooms with UV-B; (5) a fifth step of thermally treating the shiitake mushroom pieces irradiated with UV-B; and (6) a sixth step of crushing the thermally treated shiitake mushroom pieces.

In addition, the present invention may be characterized in that the pre-aging is 1 to 8 days.

In addition, the present invention may be characterized in that the aging is 1 to 8 days.

In addition, the present invention may be characterized in that the chopped shiitake mushrooms have lengths of 0.5 to 20 mm or less in width, length and height, respectively.

In addition, the present invention may be characterized in that the chopped shiitake mushrooms have the moisture content of 70 to 95 wt %.

In addition, the UV-B irradiation of the present invention may be characterized by inverting the shiitake mushrooms at a predetermined time interval 1 to 3 times every 15 minutes, while irradiating the shiitake mushroom sample with the UV-B for 30 to 180 minutes at an intensity of 1,000 to 3,000 $\mu W/cm^2$ and a relative humidity of 80 to 100% in a state that the shiitake mushroom sample is placed on a stainless steel plate of a stainless steel chamber equipped with a UV light lamp.

In addition, the present invention may be characterized in that the thermal treatment may be performed at 40 to 80° C. for 12 to 48 hours.

In addition, the present invention may be characterized in that the shiitake mushrooms prepared by the method produce vitamin D2 of 360 μg (14,400 IU)/g or more.

In addition, the present invention may be characterized in that the shiitake mushrooms prepared by the method may have a bacterial count of 1000 or less per g, and *E. coli* is negative.

In addition, the present invention may be characterized in that the shiitake mushrooms prepared by the method contain beta-glucan, polyphenol, copper (Cu), zinc (Zn), selenium (Se), ergosterol, eritadenine, a sulfur compound, an anti-inflammatory material, an immune enhancing material, an anticancer material, an antiviral material, an antibacterial material, an antifungal material, and a blood sugar regulator.

Advantageous Effects

As described above, the present invention provides shiitake mushrooms with the increased vitamin D2 content, thereby significantly increasing the vitamin D2 content 10 times to 60 times or more relative to conventional methods, and manufacturing a final product with a low bacterial count and secured safety without using any organic solvent.

DESCRIPTION OF DRAWINGS

FIG. 1 is a schematic view time-sequentially illustrating a process of preparing shiitake mushrooms with an increased vitamin D2 content of the present invention.

FIG. 2 is a graph illustrating an HPLC result of vitamin D2 produced from shiitake mushrooms of the present invention (Agilent Technologies 1200 series; vitamin D2, 23 minutes).

FIG. 3 is a graph illustrating a comparative UV spectrum result of vitamin D2 produced from shiitake mushrooms of the present invention and standard vitamin D2 (spectral comparison of standard vitamin D and vitamin D derived from shiitake mushrooms).

BEST MODE

Since the present invention may apply various modifications and include various embodiments, specific embodiments will be illustrated in the drawings and described in detail in the detailed description. However, this is not intended to limit the present invention to specific embodiments, and should be understood to include all changes, equivalents or substitutes contained in the spirit and technical scope of the present invention.

The terms including ordinary numbers, such as first, second and the like, may be used to describe various components, but the components are not limited by the terms. These terms are used only for the purpose of distinguishing one component from another component.

In the following description, a detailed description of the technology well known to those skilled in the art may be omitted. Further, in describing the present invention, if it is determined that a detailed description of related known functions or configurations may unnecessarily obscure the gist of the present invention, the detailed description thereof may be omitted. In addition, the terminologies used in the present specification are used to appropriately express the preferable embodiment of the present invention, which may vary according to the intention of a user or an operator, or the practice in the art to which the present invention pertains.

Accordingly, the definitions of these terms should be made based on the contents throughout the present specification. Throughout the specification, when a part "comprises" a component, this means that other components may be further included, rather than excluding the other component unless otherwise described.

Hereinafter, preferred embodiments according to the present invention will be described in detail with reference to the accompanying drawings.

However, the following Examples and Preparation Examples are just illustrative of the present invention, and the contents of the present invention are not limited to the following Examples and Preparation Examples.

EXAMPLES

Materials and Methods

The materials and methods used in the Examples below are as follows.
1. Sample Shiitake Mushroom Fruiting Bodies For sample shiitake mushroom fruiting bodies, a medium grade product grown in Geumgok-myeon, Jinju-si, Gyeongsangnam-do was used.
2. Pre-Cooling and Aging Storage Room The sample shiitake mushroom fruiting bodies were stored in a temperature-controlled storage room (0 to 30° C.)
3. UV Irradiation Box A sealed stainless steel chamber is equipped with three UV light lamps (280 to 360 nm: 15 W) on the top thereof, and a stainless steel plate capable of holding the sample is equipped at a distance of 10 to 20 cm from the UV light lamps (distance adjustable).
4. Sample Dryer A temperature-controlled (room temperature to 100° C.) dryer was used.
5. Vitamin D2 Analysis The sample for the analysis of vitamin D2 was prepared by a standard preparation method of the vitamin D2 of the Ministry of Food and Drug Safety, and the vitamin D2 analysis of the prepared sample was analyzed by standard a HPLC system and method of the Ministry of Food and Drug Safety. Statistics on the analyzed value were verified by a Tukey's multiple comparison test. Mean values with different English small letters within the same treatment mean that there is significance at $p<0.05$.

<Example 1> Vitamin D2 Content of Chopped Sample According to Pre-Aging Temperature and Period The shiitake mushroom fruiting bodies were pre-aged in the combination of various temperatures (0, 5, 15, and 30° C.) and various aging periods (0, 1, 4, and 8 days) in a temperature-controlled storage room immediately after harvest. The pre-aged shiitake mushroom fruiting bodies were washed with water and water on the surface of fruiting bodies was removed to select fruiting bodies having a moisture content of 80 to 95 wt %. The selected shiitake mushroom fruiting bodies were chopped to prepare a sample in the same state as sawdust (width×length×height of 3 mm or less). The sample was laid with a thickness of 0.5 to 1.0 cm on a stainless steel plate (at a distance of 15 cm from the light lamp) of a stainless steel chamber equipped with UV light lamps, and then inverted the sample once every 15 minutes while irradiating with UV for 30 minutes at an intensity of 2,000 to 3,000 µW/cm$^2$ and a relative humidity of 90 to 100%. The UV-irradiated sample was thermally treated at 60° C. for 24 hours, crushed, and used as a vitamin D2 analysis sample to measure the vitamin D2 content.

TABLE 1

Pre-aging conditions and vitamin D2 content

| Temperature (° C.) | Period (day) | Vitamin D2 content (µg/g dry weight) |
|---|---|---|
| 0 | 0 | 166.2 ± 12.4a |
|   | 1 | 165.3 ± 5.8a |
|   | 4 | 145.0 ± 7.5a |
|   | 8 | 150.2 ± 11.0a |
| 5 | 0 | 171.5 ± 20.3b |
|   | 1 | 195.1 ± 19.8a |
|   | 4 | 223.8 ± 21.9ab |
|   | 8 | 241.0 ± 18.3a |
| 15 | 0 | 171.0 ± 9.3c |
|    | 1 | 252.3 ± 12.7b |
|    | 4 | 331.2 ± 14.5a |
|    | 8 | 256.7 ± 9.0b |
| 30 | 0 | 173.3 ± 7.5c |
|    | 1 | 333.0 ± 12.5a |
|    | 4 | 295.9 ± 8.8b |
|    | 8 | 151.5 ± 7.5d |

As a result, as shown in Table 1, the sample pre-aged at 30° C. for 1 day had the highest vitamin D2 content. However, the tissue was too softened, and thus chopping was difficult, agglomeration phenomenon occurred during drying, and a slight decay phenomenon occurred, and thus the number of mold and bacteria was high, making it unsuitable for use as a sample.

<Example 2> Vitamin D2 Content of Chopped Sample According to Aging Temperature and Period Shiitake mushroom fruiting bodies were pre-aged for 1 day in a 5° C. storage room immediately after harvest, and aged again in the combination of temperatures (0, 5, 15, and 30° C.) and periods (0, 2, 5, and 8 days). The aged shiitake mushroom fruiting bodies were washed with water and water on the surface of fruiting bodies was removed to select fruiting bodies having a moisture content of 80 to 95 wt %. The aged shiitake mushroom fruiting bodies were chopped to prepare a sample in the same state as sawdust (width×length×height of 3 mm or less). The sample was laid with a thickness of 0.5 to 1.0 cm on a stainless steel plate (at a distance of 15 cm from the light lamp) of a stainless steel chamber equipped with UV light lamps, and then inverted the sample once every 15 minutes while irradiating with UV for 30 minutes at an intensity of 2,000 to 3,000 µW/cm$^2$ and a relative humidity of 90 to 100%. The UV-irradiated sample was thermally treated at 60° C. for 24 hours, crushed, and used as a vitamin D2 analysis sample to measure the vitamin D2 content.

TABLE 2

Aging conditions and vitamin D2 content

| Temperature (° C.) | Period (day) | Vitamin D2 content (µg/g dry weight) |
|---|---|---|
| 0 | 0 | 190.4 ± 22.1a |
|   | 2 | 195.1 ± 14.9a |
|   | 5 | 202.7 ± 12.3a |
|   | 8 | 192.3 ± 19.4a |
| 5 | 0 | 188.1 ± 12.6b |
|   | 2 | 212.5 ± 22.lab |
|   | 5 | 243.8 ± 12.3a |
|   | 8 | 289.9 ± 14.1a |
| 15 | 0 | 192.8 ± 11.5c |
|    | 2 | 361.5 ± 17.8a |
|    | 5 | 357.4 ± 17.2a |
|    | 8 | 242.2 ± 10.4a |
| 30 | 0 | 187.5 ± 9.8c |
|    | 2 | 331.2 ± 15.1a |
|    | 5 | 309.9 ± 16.3a |
|    | 8 | 223.6 ± 12.9b |

As a result, as shown in Table 2, the sample aged at 15° C. for 2 days had the highest vitamin D2 content, but the most suitable storage period was 2 to 5 days.

<Example 3> Vitamin D2 Content of Chopped Sample According to the Amount of UV Irradiation Shiitake mushroom fruiting bodies were pre-aged for 1 day in a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were chopped to prepare a sample in the same state as sawdust (width×length×height of 3 mm or less). The sample was laid with a thickness of 0.5 to 1.0 cm on a stainless steel plate (at a distance of 15 cm from the light lamp) of a stainless steel chamber equipped with UV light lamps, and then inverted the sample once every 15 minutes while irradiating with the amounts of UV (0, 500, 1,000, 2,000, 3,000, 4,000, and 5000 µW/cm$^2$) for 30 minutes at a relative humidity of 90 to 100%. The UV-irradiated sample was thermally treated at 60° C. for 24 hours, crushed, and used as a vitamin D2 analysis sample to measure the vitamin D2 content.

TABLE 3

| UV dosage (µW/cm$^2$) | Vitamin D2 content (µg/g dry weight) |
|---|---|
| 0 | 5.2 ± 0.6e |
| 500 | 110.9 ± 9.3d |
| 1,000 | 191.2 ± 12.8c |
| 2,000 | 350.9 ± 15.8a |
| 3,000 | 362.1 ± 12.4a |
| 4,000 | 343.7 ± 16.8a |
| 5,000 | 305.2 ± 19.1b |

As a result, as shown in Table 3, the sample irradiated with UV at 3,000 μW/cm² for 30 minutes had the highest vitamin D2 content, but there was no difference in vitamin D2 production at 2,000 to 4,000 μW/cm².

<Example 4> Vitamin D2 Content of Chopped Sample According to UV Irradiation Time and Inverting Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were chopped to prepare a sample in the same state as sawdust (width×length×height of 3 mm or less). The sample was laid with a thickness of 0.5 to 1.0 cm on a stainless steel plate (at a distance of 15 cm from the light lamp) of a stainless steel chamber equipped with UV light lamps, and then inverted at a predetermined number of times (0, 1, 2, and 3) while irradiating with UV for a predetermined time (10, 30, 60, and 120 minutes) at an intensity of 2,000 to 3,000 μW/cm² and a relative humidity of 90 to 100%. The UV-irradiated sample was thermally treated at 60° C. for 24 hours, crushed, and used as a vitamin D2 analysis sample to measure the vitamin D2 content.

TABLE 4

| UV irradiation time (min) | Number of inverting times | Vitamin D2 content (μg/g dry weight) |
|---|---|---|
| 10 | 0 | 194.7 ± 10.5b |
|  | 1 | 254.3 ± 2.4a |
|  | 2 | 276.3 ± 2.6a |
|  | 3 | 266.1 ± 3.1a |
| 30 | 0 | 193.1 ± 11.6c |
|  | 1 | 361.1 ± 18.2a |
|  | 2 | 311.8 ± 19.3b |
|  | 3 | 281.5 ± 14.6b |
| 60 | 0 | 184.2 ± 11.8c |
|  | 1 | 243.5 ± 8.9b |
|  | 2 | 311.6 ± 14.6a |
|  | 3 | 301.3 ± 22.4a |
| 120 | 0 | 194.3 ± 12.3c |
|  | 1 | 231.4 ± 11.2a |
|  | 2 | 209.1 ± 10.5b |
|  | 3 | 195.6 ± 9.5c |

As a result, as shown in Table 4, the sample inverted once at UV of 2,500 to 3,000 μW/cm² for 30 minutes had the highest vitamin D2 content, but similar vitamin D2 content was obtained even in the sample inverted twice. In addition, in the case of the sample irradiated for 60 minutes, similar vitamin D2 content was obtained even in the sample inverted twice.

<Example 5> Vitamin D2 Content of Chopped Sample According to Drying Temperature and Time after UV Irradiation Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were chopped to prepare a sample in the same state as sawdust (width×length×height of 3 mm or less). The sample was laid with a thickness of 0.5 to 1.0 cm on a stainless steel plate (at a distance of 15 cm from the light lamp) of a stainless steel chamber equipped with UV light lamps, and then inverted once every 15 minutes while irradiating with UV for 30 minutes at an intensity of 2,000 to 3,000 μW/cm² and a relative humidity of 90 to 100%. The sample irradiated with UV was thermally treated for 24 hours at a predetermined temperature (0, 20, 40, 60, 80, and 100° C.) and thermally treated at 60° C. for a predetermined time (0, 6, 12, 24, and 48 hours) and then crushed to be used as a vitamin D2 analysis sample to measure the vitamin D2 content.

TABLE 5

| Thermal-treating temperature (° C.) for 24 hours | Vitamin D2 content (μg/g dry weight) |
|---|---|
| 0 | 192.3 ± 12.1c |
| 40 | 320 ± 16.8a |
| 60 | 363.1 ± 12.9a |
| 80 | 355.4 ± 18.3a |
| 100 | 225.5 ± 10.5b |

| Thermal-treating time (hr) at 60° C. | Vitamin D2 content (μg/g dry weight) |
|---|---|
| 0 | 180.5 ± 19.2c |
| 6 | 213.3 ± 20.1b |
| 12 | 334.5 ± 18.6a |
| 24 | 362.1 ± 12.5a |
| 48 | 352.4 ± 12.1a |

As a result, as shown in Table 5, the sample thermally treated at the temperature of 60 to 80° C. for 24 hours had the highest vitamin D2 content. In addition, at the temperature of 60° C., the sample treated for 12 to 48 hours had the high vitamin D2 content.

<Example 6> Vitamin D2 Content According to Chopped Sample Amount and UV Irradiation Time Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were chopped to prepare a sample in the same state as sawdust (width×length×height of 3 mm or less). The sample was laid with various thicknesses 0.5 to 1.0, 1 to 2, 2 to 3, and 3 to 5 cm) on a stainless steel plate (at a distance of 15 cm from the light lamp) of a stainless steel chamber equipped with UV light lamps, and then inverted once every 15 minutes while irradiating with UV for various times (0, 30, 60, 90, and 180 minutes) at an intensity of 2,000 to 3,000 μW/cm² and a relative humidity of 90 to 100%. The UV-irradiated sample was thermally treated at 60° C. for 24 hours, crushed, and used as a vitamin D2 analysis sample to measure a vitamin D2 content.

TABLE 6

| Thickness (cm) of sample laid on plate | UV irradiation time (min) | Vitamin D2 content (μg/g dry weight) |
|---|---|---|
| 0.5 to 1 | 0 | 195.4 ± 9.3bc |
|  | 30 | 364.1 ± 23.3a |

TABLE 6-continued

| Thickness (cm) of sample laid on plate | UV irradiation time (min) | Vitamin D2 content (μg/g dry weight) |
|---|---|---|
|  | 60 | 360.2 ± 22.1a |
|  | 90 | 212.2 ± 14.3b |
|  | 180 | 183.5 ± 7.1c |
| 1 to 2 | 0 | 194.0 ± 9.5c |
|  | 30 | 247.4 ± 13.4b |
|  | 60 | 338.8 ± 20.6a |
|  | 90 | 313.1 ± 17.9a |
|  | 180 | 280.3 ± 18.0b |
| 2 to 3 | 0 | 196.0 ± 11.4c |
|  | 30 | 266.5 ± 21.3a |
|  | 60 | 263.6 ± 15.5a |
|  | 90 | 231.3 ± 15.7b |
|  | 180 | 181.2 ± 13.9c |
| 3 to 5 | 0 | 193.2 ± 10.8b |
|  | 30 | 224.4 ± 13.5b |
|  | 60 | 267.2 ± 19.8a |
|  | 90 | 213.5 ± 19.0b |
|  | 180 | 118.9 ± 17.1c |

As a result, as shown in Table 6, the sample laid with a thickness of 0.5 to 1.0 cm and irradiated with UV for 30 to 60 minutes had the highest vitamin D2 content. There was no difference in the vitamin D2 content between the sample laid with a thickness of 1 to 2 cm and irradiated with UV for 60 minutes and the sample laid with a thickness of 0.5 to 1.0 cm and irradiated with UV for 30 to 60 minutes.

<Example 7> Vitamin D2 Content of Chopped Sample According to Moisture Content

Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to prepare fruiting bodies having a moisture content (40, 50, 60, 70, 80, 90, and 95%) as a sample. The selected shiitake mushroom fruiting bodies were chopped to prepare a sample in the same state as sawdust (width×length×height of 3 mm or less). The sample was laid with a thickness of 0.5 to 1.0 cm on a stainless steel plate (at a distance of 15 cm from the light lamp) of a stainless steel chamber equipped with UV light lamps, and then inverted once every 15 minutes while irradiating with UV for 30 minutes at an intensity of 2,000 to 3,000 μW/cm² and a relative humidity of 90 to 100%. The UV-irradiated sample was thermally treated at 60° C. for 24 hours, crushed, and used as a vitamin D2 analysis sample to measure a vitamin D2 content.

TABLE 7

| Moisture content (%) | Vitamin D2 content (μg/g dry weight) |
|---|---|
| 40 | 195.8 ± 12.6c |
| 60 | 281.1 ± 12.1c |
| 80 | 350.8 ± 10.7a |
| 90 | 362.8 ± 18.3a |
| 95 | 329.1 ± 12.0b |

As a result, as shown in Table 7, the sample having the moisture content of 90% had the highest vitamin D2 content, but the samples having the moisture content of 80 to 95% had no difference in the vitamin D2 content.

<Example 8> Vitamin D2 Content of Chopped Sample According to Relative Humidity in Chamber Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were chopped to prepare a sample in the same state as sawdust (width×length×height of 3 mm or less). The sample was laid with a thickness of 0.5 to 1.0 cm on a stainless steel plate (at a distance of 15 cm from the light lamp) of a stainless steel chamber equipped with UV light lamps, and then inverted once every 15 minutes while irradiating with UV for 30 minutes at an intensity of 2,000 to 3,000 μW/cm² and various relative humidity (40, 60, 80, 90, and 100%). The UV-irradiated sample was thermally treated at 60° C. for 24 hours, crushed, and used as a vitamin D2 analysis sample to measure a vitamin D2 content.

TABLE 8

| Relative humidity (%) | Vitamin D2 content (μg/g dry weight) |
|---|---|
| 40 | 199.1 ± 4.5d |
| 60 | 260.4 ± 9.5c |
| 80 | 292.2 ± 15.3b |
| 90 | 365.1 ± 16.6a |
| 100 | 351.8 ± 12.0a |

As a result, as shown in Table 8, the sample having the relative humidity in the chamber of 90% had the highest vitamin D2 content, but the samples having the relative humidity of 90 to 100% had no difference in the vitamin D2 content.

<Example 9> Vitamin D2 Content According to Shape and Size of Sample

Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were sliced with various sizes (0.5 to 3, 3 to 5, 5 to 10, and 10 to 20 mm) or chopped with various sizes (0.5 to 3, 3 to 5, 5 to 10, and 10 to 20 mm) to prepare a sample. Placed 300 g of sample on a stainless steel plate (at a distance of 15 cm from the light lamp) of a stainless steel chamber equipped with UV light lamps, and then inverted once every 15 minutes while irradiating with UV for 30 minutes at an intensity of 2,000 to 3,000 μW/cm² and a relative humidity of 90 to 100%. The UV-irradiated sample was thermally treated at 60° C. for 24 hours, crushed, and used as a vitamin D2 analysis sample to measure a vitamin D2 content.

TABLE 9

| Shape of sample | Size (mm) | Vitamin D2 content (μg/g dry weight) | Remarks |
|---|---|---|---|
| Whole | 50 or less | 75.1 ± 4.4 | Non-sliced or non-chopped state |
| Slicing (mm) | 0.5 to 3 | 291.2 ± 21.1a | |
| | 3 to 5 | 233.4 ± 12.4b | |
| | 5 to 10 | 160.5 ± 5.5c | |
| | 10 to 20 | 124.2 ± 4.5d | |
| Chopping (width × length × height) | 0.5 to 3 | 359.1 ± 10.8a | |
| | 3 to 5 | 344.3 ± 14.5a | |
| | 5 to 10 | 235.5 ± 12.7b | |
| | 10 to 20 | 132.1 ± 9.6c | |

As a result, as shown in Table 9, very low vitamin D2 was produced in a non-chopped or non-sliced sample. However, the vitamin D2 content was the highest in a sample chopped to 0.5 to 3 mm or less, and had no difference from a sample chopped to 3 to 5 mm or less. Also, in the case of slicing, the vitamin D2 content was the highest in a sample sliced to 0.5 to 3 mm or less, but the content thereof was relatively lower than the chopped sample.

<Example 10> Vitamin D2 Content of Sliced Sample According to Aging Period

Shiitake mushroom fruiting bodies were pre-aged for 1 day at a storage room of 5° C. immediately after harvest, and then aged at 15° C. for various periods (0, 1, 2, 5, and 8 days) again. The aged shiitake mushroom fruiting bodies were washed with water and water on the surface of fruiting bodies was removed to select fruiting bodies having a moisture content of 80 to 95 wt %. The selected shiitake mushroom fruiting bodies were sliced at about 3 mm to prepare a sample. The sample was laid with a thickness of 0.5 to 1.0 cm on a stainless steel plate (at a distance of 15 cm from the light lamp) of a stainless steel chamber equipped with UV light lamps, and then inverted once every 15 minutes while irradiating with UV for 30 minutes at an intensity of 2,000 to 3,000 μW/cm² and a relative humidity of 90 to 100%. The UV-irradiated sample was thermally treated at 60° C. for 24 hours, crushed, and used as a vitamin D2 analysis sample to measure a vitamin D2 content.

TABLE 10

| Pre-storage period (day) | Aging period (day) | Vitamin D2 content (μg/g dry weight) |
|---|---|---|
| 1 | 0 | 186.9 ± 12.4c |
| 1 | 1 | 245.6 ± 11.5b |
| 1 | 2 | 288.4 ± 14.2a |
| 1 | 5 | 283.0 ± 18.5a |
| 1 | 8 | 223.5 ± 11.5b |

As a result, as shown in Table 10, the sample aged for 2 to 5 days had the highest vitamin D2 content.

<Example 11> Vitamin D2 Content of Sliced Sample According to UV Irradiation Time and Inverting Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were sliced at about 3 mm to prepare a sample. The sample was laid one by one on a stainless steel plate (at a distance of 15 cm from the light lamp) of a stainless steel chamber equipped with UV light lamps, and then inverted at various intervals while irradiating with UV for various times (0.5, 1.0, and 5.0 hours) at an intensity of 2,000 to 3,000 μW/cm² and a relative humidity of 90 to 100%. The UV-irradiated sample was thermally treated at 60° C. for 24 hours, crushed, and used as a vitamin D2 analysis sample to measure a vitamin D2 content.

TABLE 11

| Irradiation time (hr) | Number of inverting times | Vitamin D2 content (μg/g dry weight) | Remarks (inverting interval, min) |
|---|---|---|---|
| 0.5 | 0 | 189.2 ± 8.7b | 30 |
| | 1 | 232.1 ± 12.6a | 15 |
| | 2 | 210.7 ± 15.9a | 10 |
| | 5 | 198.2 ± 12.0b | 5 |
| 1.0 | 0 | 190.8 ± 9.2c | 60 |
| | 1 | 315.5 ± 13.4a | 30 |
| | 2 | 302.5 ± 13.2a | 20 |
| | 4 | 289.0 ± 10.5b | 15 |
| | 5 | 290.8 ± 11.2b | 10 |
| 5.0 | 0 | 192.1 ± 4.4b | 300 |
| | 1 | 112.1 ± 6.6b | 150 |
| | 2 | 129.1 ± 6.5a | 100 |
| | 5 | 101.3 ± 3.5b | 50 |
| | 9 | 67.2 ± 4.3c | 30 |

As a result, as shown in Table 11, the sample irradiated with UV for 1 hour and inverted 1 to 2 times had the highest vitamin D2 content.

<Example 12> Vitamin D2 Content According to Sliced Sample Thickness and UV Irradiation Time Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were sliced with various sizes (0.5 to 3, 3 to 5, 5 to 10, and 10 to 20 mm) to prepare a sample. The samples with various thicknesses were laid one by one on a stainless steel plate (at a distance of 15 cm from the light lamp of a stainless steel chamber equipped with UV light lamps, and then inverted every 30 minutes while irradiating with UV for various times (0, 30, 60, and 180 minutes) at an intensity of 2,000 to 3,000 μW/cm² and a relative humidity of 90 to 100%. The UV-irradiated sample was thermally treated at 60° C. for 24 hours, crushed, and used as a vitamin D2 analysis sample to measure a vitamin D2 content.

TABLE 12

| Sliced sample thickness (mm) | Irradiation time (min) | Vitamin D2 content (μg/g dry weight) |
|---|---|---|
| 0.5 to 3 | 0 | 185 ± 9.3c |
| | 30 | 248.5 ± 11.6b |
| | 60 | 298.3 ± 12.5a |
| | 180 | 271.4 ± 15.6a |

TABLE 12-continued

| Sliced sample thickness (mm) | Irradiation time (min) | Vitamin D2 content (μg/g dry weight) |
|---|---|---|
| 3 to 5 | 0 | 191.6 ± 10.2c |
| | 30 | 213.4 ± 15.5c |
| | 60 | 276.1 ± 13.4a |
| | 180 | 249.4 ± 12.0b |
| 5 to 10 | 0 | 187.4 ± 11.2b |
| | 30 | 214.7 ± 6.6a |
| | 60 | 221.3 ± 8.2a |
| | 180 | 113.6 ± 9.4c |
| 10 to 20 | 0 | 188.3 ± 10.5a |
| | 30 | 197.6 ± 5.1a |
| | 60 | 194.5 ± 5.4a |
| | 180 | 168.2 ± 4.5b |

As a result, as shown in Table 12, the sample with a sliced thickness of 0.5 to 3 mm and irradiated with UV for 60 to 180 minutes had the highest vitamin D2 content. In addition, in the case of samples of 3 to 5 mm, a sample irradiated for 60 minutes had the highest vitamin D2 content, which had no difference in content from the sample of 0.5 to 3 mm, irradiated with UV for 60 to 180 minutes.

<Example 13> Vitamin D2 Content Produced Under Optimal Conditions

Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The selected shiitake mushroom fruiting bodies were chopped to prepare a sample in the same state as sawdust (width×length×height of 3 mm or less). The sample was laid with a thickness of 0.5 to 1.0 cm on a stainless steel plate (at a distance of 15 cm from the light lamp) of a stainless steel chamber equipped with UV light lamps, and then inverted once every 15 minutes while irradiating with UV for 30 minutes at an intensity of 2,000 to 3,000 μW/cm$^2$ and a relative humidity of 90 to 100%. The UV-irradiated sample was thermally treated at 60° C. for 24 hours, crushed, and used as a vitamin D2 analysis sample to measure a vitamin D2 content.

TABLE 13

| Condition | Vitamin D2 content (μg/g dry weight) |
|---|---|
| Pre-aging (5° C., 1 day) | 360.8 ± 20.4 |
| Aging (15° C., 3 days) | 360.8 ± 20.4 |
| Sample shape (chopping, width × length × height of 3 mm) | 360.8 ± 20.4 |
| Moisture content of the sample (80 to 95%) | 360.8 ± 20.4 |
| Relative humidity of chamber (90 to 100%) | 360.8 ± 20.4 |
| UV intensity (2,000 to 3,000 μW/cm$^2$) | 360.8 ± 20.4 |
| UV irradiation time (30 minutes, inverting once after 15 min) | 360.8 ± 20.4 |
| Thermal treatment (60° C., 24 hr) | 360.8 ± 20.4 |

As a result, as shown in Table 13, the vitamin D2 content produced under the optimal conditions was measured to be 360.8±20.4 μg/g.

<Example 14> Comparison of the Vitamin D2 Content According to the Method of the Present Patent and a Conventional Patent (Korean Patent Registration No. 10-0637833)

Shiitake mushroom fruiting bodies were pre-aged for 1 day at a storage room of 5° C. immediately after harvest, and then aged at 15° C. for 3 days again. The aged shiitake mushroom fruiting bodies were washed with water and water on the surface of fruiting bodies was removed to select fruiting bodies having a moisture content of 80 to 95 wt %. The UV-irradiated sample was thermally treated at 60° C. for 24 hours, crushed, and used as a vitamin D2 analysis sample to measure a vitamin D2 content.

In the method of the conventional patent (Korean Patent Registration No. 10-0637833), an irradiation region was irradiated with UV-B at 75 KJ/m$^2$ and at 35° C. and 80% relative humidity on an inner wrinkle layer (5 mm) of the sliced shiitake mushrooms.

TABLE 14

| Method for producing vitamin D2 | Vitamin D2 content (μg/g dry weight) | Remarks |
|---|---|---|
| Production under optimal conditions of present invention | 360.8 ± 20.4 | |
| Vitamin D content produced from shiitake mushroom fruiting bodies similarly to method of Patent 10-0637883 by present research team | 35.3 ± 3.5 | Irradiation region: Overall sliced shiitake mushrooms (5 mm) UV-B irradiation amount: 3,000 μW/cm$^2$, 42 minutes ※ 1 J/m$^2$ = 100 μW · sec/cm$^2$ → * When irradiating at 3000 μW · sec/cm$^2$, it is the same as 75 KJ/m$^2$ only when irradiating at 75 KJ/m$^2$ = 2,500 μW/cm$^2$ = 42 min. * When irradiating at 2,000 μW/cm$^2$ for 62.5 minutes, it is the same as 75 KJ/m$^2$ only when irradiating for 62.5 min. UV irradiation condition: 35° C., 80% |
| Content indicated in Patent 10-0637883 | 6.93 | Irradiation region: Inner wrinkle layer (5 mm) of sliced shiitake mushrooms, 35° C., moisture content 80% |

As a result, as shown in Table 14, the vitamin D2 content produced under the optimal conditions of the present invention was 360.8±20.4 μg/g, whereas the vitamin D2 content reported in the conventional patent (Korean Patent Registration No. 10-0637833) was 6.93 μg/g, which showed that the present invention could significantly increase the vitamin D2 content by 60 times or more relative to the conventional patent. In addition, as a result of irradiating with UV after slicing shiitake mushrooms (5 mm) similar to the method described in the conventional patent, the vitamin D2 content was 35.3±3.5 μg/g, which showed an excellent effect capable of significantly increasing the vitamin D2 content by 10 times or more relative to the conventional patent.

The invention claimed is:

1. A method for preparing shiitake mushrooms with an increased vitamin D2 content comprising:
    (1) a first step of pre-aging only shiitake mushroom fruiting bodies, wherein the first step of pre-aging is to store at a temperature of 5° C. for 1 day for the increased vitamin D2 content;
    (2) after the first step is done, a second step of aging the pre-aged shiitake mushroom fruiting bodies, wherein the second step of aging is to store at a temperature of 15° C. for 2 to 8 days for the increased vitamin D2 content;

(3) a third step of chopping the aged shiitake mushroom fruiting bodies;

(4) a fourth step of irradiating the chopped shiitake mushroom fruiting bodies with UV-B for the increased vitamin D2 content;

(5) a fifth step of thermally treating the shiitake mushroom fruiting bodies irradiated with UV-B for the increased vitamin D2 content; and (6) a sixth step of crushing the thermally treated shiitake mushroom fruiting bodies for the increased vitamin D2 content, wherein the chopped shiitake mushroom fruiting bodies have lengths of 0.5 to 20 mm in width, length and height, respectively, and the thermal treatment is performed at 40 to 80° ° C. for 12 to 48 hours, wherein the shiitake mushroom fruiting bodies prepared by the method produce vitamin D2 of 360 μg (14,400 IU)/g or more.

2. The method for preparing the shiitake mushrooms with the increased vitamin D2 content of claim 1, wherein the chopped shiitake mushroom fruiting bodies have a moisture content of 70 to 95 wt %.

3. The method for preparing the shiitake mushrooms with the increased vitamin D2 content of claim 1, wherein the UV-B irradiation is characterized by inverting the shiitake mushroom fruiting bodies at a predetermined time interval of 1 to 3 times every 15 minutes, while irradiating the shiitake mushroom fruiting bodies with the UV-B for 30 to 180 minutes at an intensity of 1,000 to 3,000 μW/cm² and a relative humidity of 80 to 100% in a state wherein the shiitake mushroom fruiting bodies are placed on a stainless steel plate of a stainless steel chamber equipped with a UV light lamp.

* * * * *